United States Patent Office 2,942,691
Patented June 28, 1960

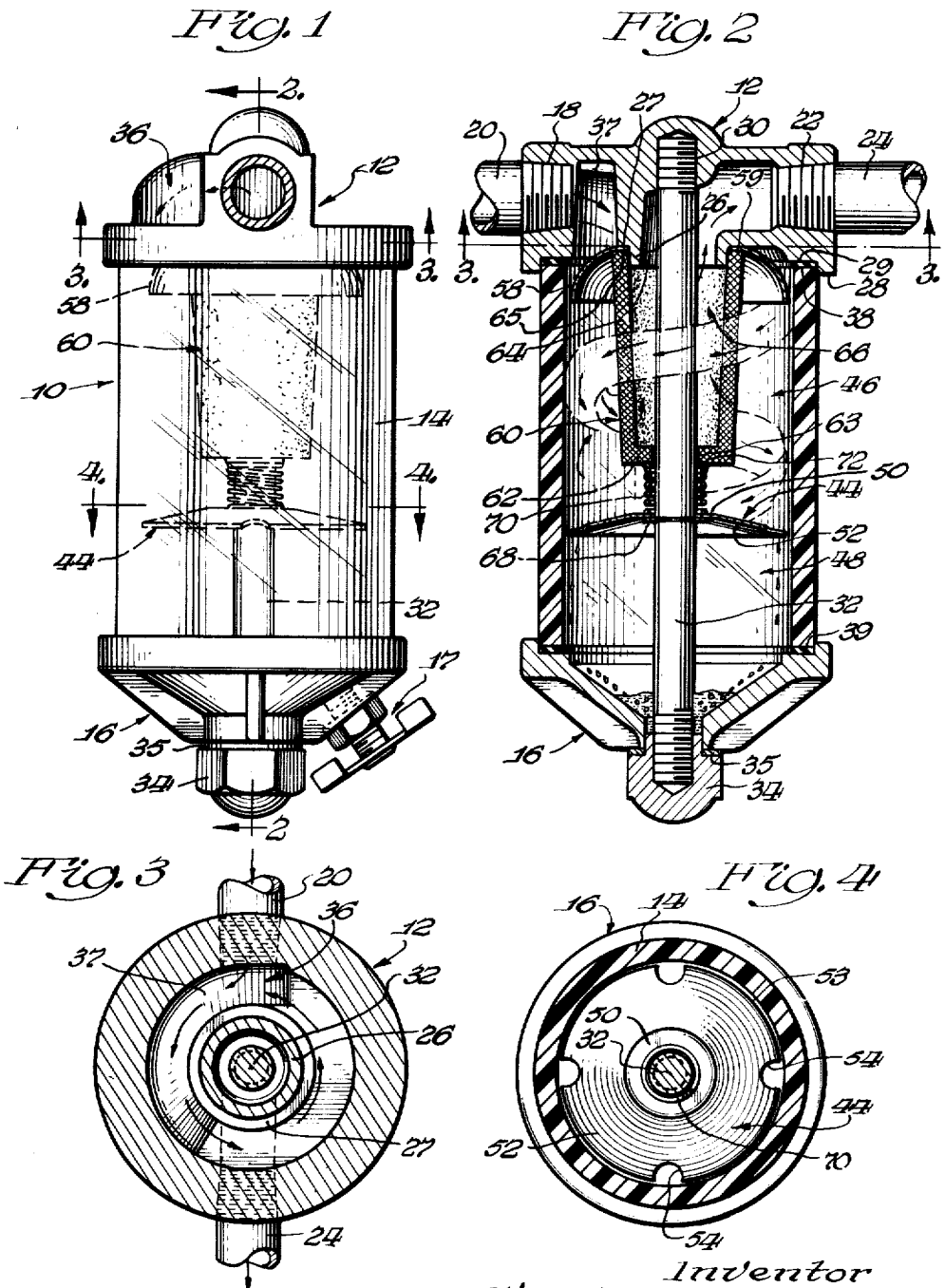

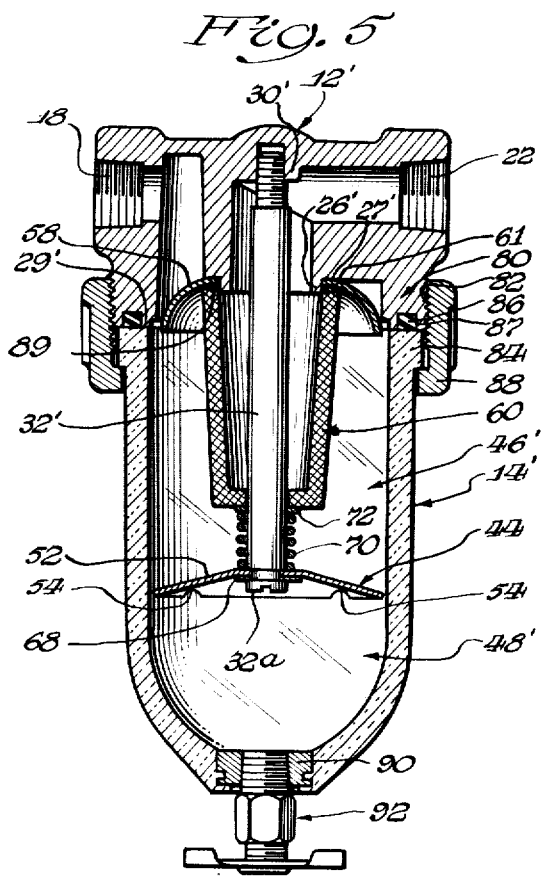

2,942,691
AIR LINE FILTER

Wendell M. Dillon, Lawrence, Mass., assignor to Watts Regulator Company, Lawrence, Mass., a corporation of Massachusetts Filed Sept. 27, 1956, Ser. No. 612,561

1 Claim. (Cl. 183—67)

This invention relates to an air line filter and more particularly to an apparatus for separating dust and other impurities from a moving stream of air that is being supplied from a source of pressurized air. Still more particularly, this invention is directed to a filter for removal of contaminants from a stream of compressed air that is later to be used as the air supply of a pneumatic lubricating system.

The use of pneumatic lubricating systems is becoming more prevalent in industry. One of the most difficult problems incident to successful use of a pneumatic lubricating system lies in the requirement that the compressed air be as free as possible from contaminants or extraneous particles. Unfortunately many small particles of dust, moisture, or abrasive matter are easily air borne, and when the compressed air or gas, containing such contaminants is moving at high speed or under high pressure from its source, the air imparts sufficient velocity to such particles to cause separation of the particles from the air to be a difficult problem.

The problem is further complicated by the fact that the air borne particles are usually not of uniform size or weight and thus the presence of a range of particle size and weights poses a problem of providing an operative arrangement which includes a filter which will be fine enough to filter out the very fine particles without having the filter clogged up too quickly by the larger size particles.

Thus, one object of this invention is to provide a new and improved air line filter which solves the above defined problems by providing a unitary design which includes a first means for separating the larger size and weight particles, and a second means for separating the smaller size and weight particles.

Another object of this invention is to provide an improved air line filter which first directs incoming air containing air-borne impurities in a centrifugal spiral path to effect inertia separation of the impurities from said air, and then directs the air through a fine porous bronze filter for effecting a separation of fine impurities from the air.

A further object of this invention is to provide an improved air line filter which is divided into an upper annular whirl chamber wherein inertia separation of airborne particles is effected, a lower chamber wherein the inertia-separated particles are collected, and an axially disposed sub-chamber separated from the upper chamber by a fine porous bronze filter which serves to filter out the residual airborne particles from the air passing through the filter.

Still another object of this invention is to provide a new and improved air line filter which is characterized by its simplicity and inexpensiveness of construction and by its efficiency and quality of operation.

With these and other objects in view, my invention consists in the construction, arrangement and combination of the various parts of my air line filter whereby the objects contemplated are obtained as hereinafter more fully set forth, pointed out in my claim and illustrated in the accompanying drawing, wherein:

Fig. 1 is an elevational view of an air line filter embodying the instant invention and is taken looking from the left of Fig. 2;

Fig. 2 is a cross-sectional view taken on line 2—2 of Fig. 1 and illustrates therein the movement of air through the air line filter;

Figs. 3 and 4 are cross-sectional views taken respectively on lines 3—3 and 4—4 of Fig. 1;

Fig. 5 is a vertical cross-section view, similar to Fig. 2, but showing a modified form of air line filter.

Referring now to the drawings, there is shown in Figs. 1 and 2 the air line filter of this invention generally indicated at 10. The air line filter includes a head member 12, and a body member 14. The body member 14 may be of any suitable shape and may be formed of any suitable material such as metal or the like, but preferably it is cup shaped or annular and is formed of a transparent material such as glass or a transparent plastic. There is also provided cap means 16 for closing the lower end of the body member 14. The cap means 16 carries a drain means generally indicated at 17. The head member 12, body member 14, and cap means 16 together enclose a space within which the air filtering operation takes place.

Referring to certain specific details of head member 12, it will be seen that said head member is provided with a first tapped boss 18 adapted to receive an air inlet pipe 20, and a second tapped boss 22 adapted to receive an air outlet pipe 26. Preferably the tapped bosses 18 and 22 are in alignment, although it is not necessary that they be so arranged.

The lower side of head member 12 is shaped to define an inner annular shoulder 26 and an adjacent annular seat 27 located outwardly of shoulder 26. The head member 12 also defines an outer annular shoulder 28 and an adjacent seat 29 located inwardly of shoulder 28. The annular shoulders 26 and 28, and seats 27 and 29, are arranged concentrically. The head member 12 is also provided with a central tapped boss 30 arranged axially relative to shoulders 26 and 28.

Extending upwardly, axially of the cap means 16, and of the cylindrical body 14, and of head member 12, is an elongated bolt 32 which threads into tapped boss 30. The lower end of elongated bolt 32 is also threaded, and a hex cap 34 is threaded thereonto. The arrangement of bolt 32 and hex cap 34 provides a simple connection means for maintaining the entire structure assembled. An appropriate sealing washer, or gasket 35 may be provided between cap 34 and cap means 16.

The head member 12 is also formed to define a contoured inlet means, generally indicated at 36, which communicates with the air inlet connection defined by air inlet pipe 20. This contoured means 36 defines a segment of a helical flow passageway and includes a downwardly sloping helical wall segment 37 which directs the incoming air into a downwardly advancing helical path.

In order to provide an air-tight assembly, a gasket 38 is provided between seat 29 and the upper end of body member, or casing, 14. Another sealing gasket 39 is provided between the lower end of body member 14 and cap means 16. Said gaskets 28 and 39 together with sealing gasket 35 provide for an air-tight filter casing.

In the interior of the casing there is provided a generally horizontally disposed space-dividing plate 44 which divides the interior of the casing into an upper turbulent-area chamber 46, and a lower quiet-area chamber 48. The dividing plate 44 is spaced above the lower end of body member 14 at about one-third of the height of said body member 14.

The upper surface of said dividing plate 44 presents a central flat portion 50 and an annular frusto-conical portion 52 which tapers downwardly toward the outer peripheral edge. The outer peripheral edge of dividing plate 44 is spaced from the inner wall of body member 14 to define a narrow annular space 53 therebetween. The outer periphery of the dividing plate 44 also has formed therein a plurality of notches 54 symmetrically disposed about said periphery, and which notches 54 are particularly shown to be semi-circular in shape.

Also provided within casing 14 is a bell-shaped baffle plate 58 located at the upper boundary of the turbulent-area chamber 46, at the inlet end of said chamber 46. The bell-shaped baffle 58 has a central annular flat portion 59 adapted to be seated against seat 27 in head member 12, the shoulder 26 serving to keep the bell-shaped baffle 58 concentrically arranged within the casing. The bell-shaped baffle 58 is formed of sheet metal and defines an upper convex surface and a lower concave surface.

Also positioned within the turbulent-area chamber 46 is a hollow filter means which includes an annular porous metal filter 60 which is preferably formed of porous bronze. The filter 60 has a horizontal portion 62 having a central aperture 63, and the remainder 64 of the porous filter 60 is of inverted frusto-conical shape. The annular edge 65 of the frusto-conical portion 64 of the porous filter is adapted to engage and clamp the annular flat portion 59 of bell-shaped baffle 58 against seat 27 on head member 12.

The porous metal filter 60 serves to at least partially define the inner peripheral boundary of an annular space in which the incoming air is caused to move helically, and said filter 60 also surrounds and partially defines a filtered air chamber 66 which communicates to the air outlet pipe 24 by means of appropriate passageways, or flow channels, formed in the head member 12.

The dividing plate 44, porous metal filter 60, and bell-shaped baffle 58 are retained in position by means which will now be described. The elongated bolt 32 is notched to receive inwardly extending teeth of a snap ring 68. The snap ring 68 when mounted on bolt 32 serves as an abutment against which the dividing plate 34 abuts. A compression coil spring 70, positioned to surround bolt 32 is arranged in abutting relation between dividing-plate 44 and the horizontal portion 62 of filter 60. Said spring 70 thus serves to force filter 60 against bell-shaped baffle 58 which abuts seat 27 in head member 12.

A sealing washer, or gasket 72 is provided between the upper end of spring 70 and filter 60, which gasket serves to seal off the annular passageway formed between bolt 32 and the aperture 63 which is slightly larger than bolt 32.

In the operation of the device above described, incoming air passes from pipe 20 through passageway 36 where it is directed by sloping helical wall 37 in a downwardly advancing spiral path. The upper convex surface of bell-shaped baffle 58 assists in defining the space through which the spirally moving air passes from the head member 12 into the turbulent-area chamber, or whirl chamber, 46. Baffle 58 thereby cooperates in directing the incoming air in its spiral path, and also serves to limit mixing of air that has already traversed said spiral path with the incoming air. Fig. 2 illustrates the movement of the stream of air in its spiral, or helical, path within turbulent-area chamber, or whirl chamber, 46.

The movement of the stream of air at high speed in a helical path operates to centrifuge the larger size and weight particles of dust, dirt, moisture, and the like, from the incoming air. The incoming air moves helically downwardly until it strikes dividing plate 44 and then the direction of the air is abruptly changed. The momentum, or inertia, of the larger size and weight air-borne particles is operative to effect an additional separation of said particles from the incoming air by reason of the abrupt change of direction of movement of the air.

Once that separation has been effected between the particles and the high speed stream of incoming air, said particles gravitate downwardly. If the particles are close to the inner wall of casing they may pass through annular space 53, or through notches 54, down into the quiet-area chamber 48. If some of the particles fall onto dividing plate 44, they still continue to gravitate downwardly along the sloping frusto-conical surface 52 of plate 44.

The initial separation of particles by way of centrifuging or by inertia and momentum may be considered a coarse separation of the larger size particles from the incoming air. The air will still carry therein the finer particles which escaped the coarse separation effected by reason of centrifugal forces and the inertia effect. In order to remove these finer particles from the air, the air is then caused to pass through a porous metal filter 60, which is preferably formed of bronze to prevent corrosion thereof. The term porous as applied to filter 60 is used to indicate a material, or condition of material, which provides therethrough a multiplicity of fluid passageways each of small, microscopic area, but which offers a resistance to the flow of fluid which still permits a reasonable free flow of air or gas through it. It will be understood that a careful balance as to passageway size must be maintained in said porous metal. On the one hand the flow passageways must be sufficiently fine to effect filtering of contaminants from the air or gas, and on the other hand the passageways must not be so small as to provide too great resistance to the flow of fluid therethrough.

The porous metal filter forms a very fine and efficient filter means. The finer particles carried by incoming air are now separated from the air by filter 60. The fact that the larger particles had been earlier separated out operates to prevent rapid clogging of the pores or passageways of filter 60 and thus the efficiency of the apparatus is increased. The filtered air that has passed through the filter 60 into filtered air chamber 66 is then drawn off through air outlet pipe 24. It is to be understood that while the instant device discloses use of a porous metal cone as a filtering medium, it is entirely possible that other suitable materials could be substituted therefor and, accordingly, it is intended that the claim herein be construed to cover other suitable materials which are the mechanical equivalent of the porous metal filter herein disclosed.

In order to provide for removal of the particles which are accumulated in the quiet-area chamber 48, the drain means 17 are provided openings through cap means 16 into the quiet-area chamber 48.

In the modified form of device shown in Fig. 5, the parts which are similar to parts shown in Fig. 2 are similarly numbered, and where there is some modification the part bears the same number with a prime (′) notation. New elements are designated by new numerals. Thus, there is provided a head member 12′ and a body member 14′. The head member has an annular attachment portion 80 which is threaded at 82, and the body member 14′ is provided with an outwardly turned annular flange 84 arranged and adapted to abut against the head member 12′. A sealing gasket 86 is provided in an annular recess 87 formed in head 12′, and against which the body member 14′ is adapted to seal. A flanged ring 88 is provided, threaded to threads 82 on head member 12′, and cooperates to clamp head 12′ and body 14′ together in assembled condition, as shown.

Referring more specifically to the head member 12′, said head member, the lower terminus of annular portion 80 provides an outer annular seat 29′, and a head member 12′ also provides an inner annular seat 27′ formed adjacent a downwardly extending shoulder 26′. The body member 14' is clamped against the outer annular seat 29' by means of flanged connecting ring 88.

Within the air line filter there is provided an elongated bolt member 32' which threads into the tapped boss 30', and which maintains the internal members of the filter in proper position. It will be seen that bolt member 32' is considerably shorter than bolt member 32 of Fig. 2. The internal members of the filter include the space-dividing plate 44, coil spring 70, sealing gasket 72, frusto-conical porous metal filter 60, and the bell-shaped baffle 58. A gasket 89 is provided between the upper edge of filter 60 and bell-shaped baffle 58, as shown. The elongated bolt 32' terminates below the space-dividing plate 44 and is provided with a head 32a for retaining the snap ring 68 in position.

The body member 14' is of unitary construction as contrasted with the body member 14 of Fig. 2. This permits of simple assembly of body member 14' onto head 12' by means of the threaded ring, or nut, 88. Said body member 14' is generally cup-shaped and is provided with a tapped insert 90 at the lowermost portion thereof, and a manually operable drain means 92 is threaded into the tapped insert 90. The latter drain arrangement provides for full draining of the matter that is separated out from the air, and which settles into the quiet-area chamber 48' of the air line filter.

It will be understood that other devices have heretofore utilized what may be termed a whirl chamber in that the air to be cleaned is caused to develop a rotating characteristic. However, in the instant device, the stream of incoming air is channeled and controlled to a limited cross-sectional area so that there is obtained a high velocity of air in the incoming stream, and further, the incoming air is directed spirally downward, whereby the solids and heavy condensates are directed to be deposited below the baffle 44. This latter action yields a higher degree of cleaning action than is achieved in existing filters. Furthermore, the very simple manner in which the spiral pattern of flow along the periphery of the bowl is attained contributes to the simplicity and effectiveness of the device.

While it is stated hereinabove that this filter is particularly for use with a pneumatic lubricating system, it will be evident that this air line filter may be used in any air line system where filtering or straining of the air is required.

Some changes may be made in the construction and arrangement of the parts of my air line filter without departing from the real spirit and purpose of my invention, and it is my intention to cover by my claim any modified forms of structure or use of mechanical equivalents which may reasonably be included within its scope.

I claim as my invention:

An air line filter comprising a head member defining air inlet and outlet connections, means on the underside of said head member defining a pair of concentric shoulders and a central tapped boss, an annular cup-shaped filter having a bottom wall with a central aperture therethrough mounted on the inner one of said pair of concentric shoulders, an annular body mounted on the outer one of said pair of concentric shoulders, an elongated bolt extending upwardly coaxially of said body and through the said central aperture in the bottom wall of said annular filter and being threaded into said central tapped boss in said head member, the size of said bolt being slightly less than the central aperture of said annular filter so as to substantially separate the space surrounded by said filter from the space surrounding said filter, an abutment defined on said bolt and spaced below the filter, a space-dividing plate cooperating with said annular body for dividing the space surrounded by said annular body into an upper space above said plate and a lower space below said plate, said plate being carried on said abutment defined on the bolt, and a coiled compression spring surrounding said bolt and bearing at its lower end against said space-dividing plate and bearing at its upper end against the bottom wall of said annular filter.

References Cited in the file of this patent

UNITED STATES PATENTS

| | | |
|---|---|---|
| 1,107,485 | Bowser | Aug. 18, 1914 |
| 1,854,010 | Woodford | Apr. 12, 1932 |
| 1,912,235 | Winslow | May 30, 1933 |
| 2,010,456 | Jones | Aug. 6, 1935 |
| 2,330,945 | Becker | Oct. 5, 1943 |
| 2,467,408 | Semon | Apr. 19, 1949 |
| 2,565,690 | Ketelsen | Aug. 28, 1951 |
| 2,606,628 | Hasselwander | Aug. 12, 1952 |
| 2,692,655 | Peeps | Oct. 26, 1954 |
| 2,720,278 | Wiley | Oct. 11, 1955 |
| 2,742,106 | Resko et al. | Apr. 17, 1956 |
| 2,894,600 | Veres | July 14, 1959 |

FOREIGN PATENTS

| | | |
|---|---|---|
| 293,945 | Germany | Sept. 6, 1916 |
| 1,027,706 | France | Feb. 18, 1953 |